United States Patent [19]

Iwase et al.

[11] 3,723,587
[45] Mar. 27, 1973

[54] ELIMINATION OF THE GRINDING OF CALCINED FERRITE IN THE PRODUCTION OF ANISOTROPIC MAGNETS

[75] Inventors: Keizo Iwase, Shiga-gun; Toshio Takada, Kyoto; Yoshichika Bando, Takatsuki; Masao Kiyama, Kyoto; Itsusaku Naito, Tokyo; Masao Kazihara, Kawagoe, all of Japan

[73] Assignee: Tokyo Shoketsu Kinzoku Kabushiki Kaisha, Tokyo, Japan

[22] Filed: Feb. 25, 1971

[21] Appl. No.: 118,705

[30] Foreign Application Priority Data

Mar. 2, 1970  Japan.................................45/18072

[52] U.S. Cl............264/61, 252/62.63, 264/DIG. 58, 264/66, 264/108
[51] Int. Cl. .......................C04b 35/26, C04b 35/64
[58] Field of Search...........264/DIG. 58, 108, 61, 66; 252/62.62, 62.63

[56] References Cited

UNITED STATES PATENTS

| | | | |
|---|---|---|---|
| 3,412,461 | 11/1968 | Cochardt | 264/DIG. 58 |
| 3,458,927 | 8/1969 | Wiechec | 264/DIG. 58 |
| 3,546,122 | 12/1970 | Nishizawa et al | 252/62.63 |
| 2,964,793 | 12/1960 | Blume, Jr. | 264/DIG. 58 |
| 3,574,114 | 4/1971 | Monforte | 252/62.62 |

*Primary Examiner*—Donald J. Arnold
*Assistant Examiner*—John H. Miller
*Attorney*—Young & Thompson

[57] ABSTRACT

Anisotropic metal oxide magnets are produced by mixing at least one of $\alpha$-FeOOH having rectangular plate or needle crystal form, $\alpha$-Fe$_2$O$_3$ obtained by thermally decomposing the above described $\alpha$-FeOOH, Fe$_3$O$_4$ obtained by reducing the above described $\alpha$-Fe$_2$O$_3$ and $\gamma$-Fe$_2$O$_3$ obtained by reoxidizing the above described Fe$_3$O$_4$ with at least one of barium compounds, strontium compounds and lead compounds so as to adjust the product composition to be approximately MO·6Fe$_2$O$_3$, wherein M is at least one metal of Ba, Sr and Pb, charging the resulting mixture in a press mold and subjecting to a primary compression molding under a pressure of 0.05 to 6 ton/cm$^2$, primary sintering the compressed product at a temperature of 300° to 1,150°C, putting the sintered product in a press mold and subjecting to a secondary compression molding in the same direction as in the primary compression molding under a pressure of 0.3 to 10 ton/cm$^2$ and secondarily sintering the compressed product at a temperature of 1,050°C to 1,400° C. Optionally, the barium, strontium, or lead compounds can be added either after the first cold pressing step or after the partial sintering step instead of prior to the first cold pressing step.

12 Claims, 2 Drawing Figures

ELIMINATION OF THE GRINDING OF CALCINED FERRITE IN THE PRODUCTION OF ANISOTROPIC MAGNETS

The present invention relates to a process for producing anisotropic metal oxide magnets.

An object of the present invention is to provide a novel process for producing anisotropic metal oxide magnets having excellent properties, in which a mass production can be made by means of a simple apparatus in a few steps and in a high operation speed.

The other object of the present invention is to provide a process for producing anisotropic metal oxide magnets, in which cutting workings, such as piercing, screw cutting, and the like can be easily carried out.

A further object of the present invention is to provide a method for producing anisotropic metal oxide magnets having a complicated shape, for example, a segment in a high dimension accuracy.

The previous process for producing anisotropic metal oxide magnets having a high BHmax (maximum energy product) comprises weighing the starting material so as to adjust the product composition to be about $MO \cdot 6Fe_2O_3$ (M represents at least one of Ba, Sr and Pb), calcining the resulting mixture at a temperature higher than 1,200°C and then mechanically pulverizing the calcined product to obtain ferrite powder, granulating the powder, subjecting the resulting particles to a compression molding gradually in a magnetic field to orient the easily magnetizing direction (C axis direction) of the particles to a given direction and sintering the oriented particles at a temperature of about 1,300° to 1,400°C. Furthermore, in the above described magnetic operation there have been known the wet process wherein the ferrite particles suspended in a liquid are subjected to a compression molding and the dry process wherein the ferrite particles are subjected to a compression molding in a dry state.

As well known, the above described wet process can provide anisotropic metal oxide magnets having an excellent magnetic property of BHmax of about 3.0 to 4.0 ($\times 10^6$ OeG) but has demerits in view of the drying and removal of the suspension and is inefficient, so that this process is utilized only for the production of particular magnets in a small scale.

On the other hand, in the dry process the rotation of the ferrite particles is retarded by the friction between the particles with each other, when the easily magnetizing direction of the particles is rotated and oriented to the direction of the magnetic field and it is difficult to effect the complete orientation and consequently BHmax is about 1.8 to 3.2 ($\times 10^6$ OeG) and the magnetic property is poor, nevertheless the production efficiency is high, so that the above described dry process has been universally used in the mass production of anisotropic metal oxide magnets.

However, the above described conventional processes have the following demerits.

1. The steps for calcining the starting material powders and pulverizing the calcined product are essentially needed and the pulverizing step must be effected until the particle size becomes about $1\mu$ in order to facilitate the rotation and orientation of the particles in the magnetic operation and therefore the pulverizing step should be repeated many times.

2. The step for forming the magnetic field is essentially necessary, so that a complicated apparatus is necessary and the compression must be effected gradually in order to make the orientation of the particles complete as far as possible in the magnetic operation and to prevent the cracking and breaking in the product and only one or two magnets per minute are produced and the production efficiency is very low.

3. The cutting workings, such as piercing, screw cutting, and the like for forming a bore, screw, etc., which cannot be formed by a press mold, cannot be carried out after the sintering unless a particular tool is used and consequently it is necessary to add a large amount of a binder to the pulverized powder and then mold the mixture and dry the molded product fully and carry out the cutting workings, such as piercing, screw cutting, and the like prior to the sintering.

4. In the case when a magnet having a complicated shape, for example, a segment, and the like is produced, different shrinkage occurs in the sintering depending upon the shape direction and the orientation direction of the particles and therefore it is difficult to obtain the product having a high dimension accuracy.

Moreover, when anisotropic metal oxide magnets are produced in a mass production in a conventional process, the above described dry process must be adopted in view of the production efficiency and in this case only the magnet having BHmax of 1.8 – 3.2 ($\times 10^6$ OeG) and BHc(Oe) of about 1,500 – 2,000 is obtained.

The inventors have made various investigations to solve these demerits and found that at least one of $\alpha$-FeOOH having a rectangular plate or needle crystal form, the major axis of which is 0.1 to $5\mu$, preferably 0.3 to $3\mu$, $\alpha$-$Fe_2O_3$ obtained by thermally decomposing this $\alpha$-FeOOH, $Fe_3O_4$ obtained by reducing this $\alpha$-$Fe_2O_3$ and $\gamma$-$Fe_2O_3$ obtained by reoxidizing this $Fe_3O_4$ (these are referred to as "the starting Fe compounds" hereinafter), is mixed with at least one of the compounds of $BaCO_3$, $SrCO_3$, PbO and the like so as to adjust the product composition to be approximately $MO \cdot 6Fe_2O_3$, the resulting mixture is subjected to a compression molding in a press mold and then sintered, whereby anisotropic metal oxide magnets, wherein the C plane of the particles is oriented to the direction substantially perpendicular to the compression direction, and the present invention has been established.

The present invention consists in a process for producing anisotropic metal oxide magnets, which comprises mixing at least one of compounds of Ba, Sr and Pb to at least one of the above described $\alpha$-FeOOH, $\alpha$-$Fe_2O_3$, $Fe_3O_4$ and $\gamma$-$Fe_2O_3$ and if necessary adding a magnetic property improving additive, so as to adjust the product composition to be approximately $MO \cdot 6Fe_2O_3$, charging the resulting mixture into a press mold and subjecting to a compression molding under a pressure of 0.05 to 6 ton/cm², preferably about 1 to 3 ton/cm², primarily sintering the compressed product at 300° to 1,150°C, preferably 800° to 1,100°C, putting again the sintered product in a press mold, subjecting again it to a compression molding under a pressure of 0.3 to 10.0 ton/cm², preferably about 2 to 5 ton/cm² in the same direction as that of the former compression molding, if necessary subjecting the compressed product to a cutting working, such as piercing or screw cutting and then secondarily sintering the thus treated product at 1,050° to 1,400°C, preferably 1,100° to 1,400°C.

According to the present invention, instead of the addition of at least one of the compounds of Ba, Sr and Pb, if necessary a magnetic property improving additive in the starting step, it is possible to impregnate an aqueous solution of these compounds in the above described amount into the primarily compressed product or the primarily sintered product and the other steps are the same as described above.

Furthermore, according to the present invention the following step may be effected.

To the starting Fe compounds are added Ba, Sr and Pb compounds, if necessary the magnetic property improving additives and water is added thereto and the resulting mixture is thoroughly kneaded and the resulting mass is charged in a press mold provided with a filter therein and subjected to the primary compression molding under the same condition as described above to separate and discharge water, the compressed product is dried and then is treated with the same manner as described above under the same conditions as described above.

The reason why the process of the present invention does not need the calcination of the starting material, the mechanical pulverization and the magnetic operation will be explained in more detail. This is based on the following facts. The minor axis ([100]-axis) of $\alpha$-FeOOH having rectangular plate or needle crystal form is easily oriented parallel to the compression direction only by the compression without the magnetic operation and said $\alpha$-FeOOH particles effect topotactic reaction with a compound of $BaCO_3$, $SrCO_3$, $PbO$ and the like. As shown in the following Examples, such $\alpha$-FeOOH particles can provide anisotropic metal oxide magnets by one time of compression molding and one time of sintering (temperature: about 1,200° to 1,400°C) without effecting the calcination, mechanical pulverization and magnetic operation.

$\alpha$-$Fe_2O_3$ obtained by thermally decomposing $\alpha$-FeOOH having rectangular plate or needle crystal form maintains substantially the same particle form as the original form of $\alpha$-FeOOH. $Fe_3O_4$ obtained by reducing $\alpha$-$Fe_2O_3$ and $\gamma$-$Fe_2O_3$ obtained by reoxidizing $Fe_3O_4$ maintain also substantially the same particle form as the original form of $\alpha$-FeOOH. According to these chemical changes, the plate surface of the formed oxides have the following crystal planes Furthermore, these iron compounds effect topotactic reaction with Ba, Sr and Pb compounds and all these planes are converted into C plane of ferrite as follows:

When the above described iron oxides are compressed, (100) plane of $\alpha$-FeOOH, (0001) plane of $\alpha$-$Fe_2O_3$ and (111) planes of $Fe_3O_4$ and $\gamma$-$Fe_2O_3$ are oriented perpendicularly to the compression direction, so that when these oxides are reacted with Ba, Sr and Pb compounds, in any case anisotropic magnets wherein the C planes of the particles are oriented perpendicularly to the compression direction in view of the above described direction relation, can be obtained. Accordingly, they can be used as the starting material of the present invention.

The major axis of the crystals of a large part of the above described starting Fe compounds which exist practically, is within a range of 0.1 to $5\mu$ and the compounds exceeding this range are hardly oriented perpendicularly to the compression direction, when they are compressed. Of course, even when a small part of such compounds exceeding this range are admixed in the starting Fe compounds having the above described range, the object of the present invention can be attained.

According to the present invention, the compression molding and the sintering are not carried out only one time respectively, but the following steps, that is primary compression molding, primary sintering → secondary compression molding, secondary sintering are effected. This is the most important characteristic in the present invention. The reason why such process is adopted, will be explained hereinafter.

As mentioned above, when $\alpha$-FeOOH having rectangular plate or needle crystal form, the thermally decomposed $\alpha$-$Fe_2O_3$, the reduced $Fe_3O_4$ and the reoxidized $\gamma$-$Fe_2O_3$ are used as the starting material, they can provide anisotropic metal oxide magnets through one time of compression molding and one time of sintering temperature: about 1,200° to 1,400°C) but the magnetic properties of the thus obtained magnets are limited to substantially the same extent as those of magnets obtained by the conventional dry process. In this case, the size and the shape of the starting material should be taken into consideration. Furthermore, according to the experiments carried out by the inventors, it has been found that if the pressure in the compression molding is high, the apparent density of the product can be increased and the orientation of the particles can be arranged and consequently the magnetic properties of the product can be improved, while the high pressure is apt to cause cracks in the compressed product upon the sintering and, for example, when the starting material is compressed under a pressure of about 5 ton/cm², the magnetic properties are improved but it is impossible to avoid the cracking in the sintering and even if the compression molding is effected under a pressure of about 3 ton/cm², the cracks are often caused in the sintering.

On the contrary, if the starting material is subjected to the primary compression molding, the primary sintering → secondary compression molding and the secondary sintering, the anisotropic metal oxide magnets having the same extent of excellent magnetic properties as those obtained by the conventional dry process can be easily obtained.

Namely, according to the process of the present invention, the starting material is firstly filled in a press mold and subjected to a compression molding under such a pressure that a sufficient tenacity to enable the compressed product to be handled as a molded body can be provided and that any cracks are not caused in the sintering, that is usually under a pressure of 0.05 to 6.0 ton/cm², preferably 1 to 3 ton/cm² and then the molded product is primarily sintered under such a condition that the sintering does not proceed completely, that is usually at 300° – 1,150°C, preferably 800° to 1,100°C. In the resulting sintered product, the particles are oriented in a direction substantially perpendicular to the compression direction but the density is not so high and the sintered product is porous. The selection of the sintering temperature of 300° to 1,150°C in the primary sintering, at which the sintering does not proceed completely, is based on the following reason. Such a temperature permits the further increase of the density and the more complete orientation of the easily magnetizing direction of the particles to occur in the secondary compression molding.

Then, the above described sintered product is put in a press mold and is subjected to the secondary compression molding in the same direction as in the primary compression molding under the same or higher pressure than the primary compression molding, usually 0.3 to 10 ton/cm$^2$, preferably 2 to 5 ton/cm$^2$ and then the resulting compressed product is subjected to the secondary sintering under such a condition that the sintering fully proceeds and the chemical reaction is completed, usually at 1,050° to 1,400°C, preferably 1,100° to 1,400°C.

The thus obtained anisotropic metal oxide magnets have no cracks and have an improved apparent density, a highly uniform orientation of the easily magnetizing direction of the particles and an excellent magnetic property of BHmax 2.3 – 3.7 ($\times 10^6$ OeG). The excellent magnetic properties of the thus obtained anisotropic metal oxide magnet are based on the following reasons. It is possible to apply a high pressure in the compression molding and most of various foreign substances, which affect adversely the orientation of the particles to a given direction, are removed in the primary sintering and consequently the secondary compression molding and the secondary sintering can be carried out under a condition free of the adverse interference.

Furthermore, by adopting the above described steps, that is the primary compression molding, the primary sintering → the secondary compression molding, the secondary sintering, cutting workings, such as piercing, screw cutting and the like can be very easily conducted without using any particular tools or a large amount of binder, when such workings are conducted prior to the secondary sintering.

Namely, for example, the sintered product obtained by filling the starting material in a press mold and subjecting to a compression molding under a pressure of about 3 ton/cm$^2$ and then sintering at about 800° to 1,100°C or the compressed product obtained by applying this sintered product to another compression molding under a pressure of about 2 to 5 ton/cm$^2$ is not so high in the density and is porous and the sintering is not completely finished, so that the cutting workings, such as piercing, screw cutting and the like can be easily conducted by means of usual tools. The sintered product after r the secondary sintering at 1,050° to 1,400°C cannot be subjected to the above described cutting workings by usual tools as in the conventional process.

Furthermore, in order to prevent the formation of cracks in the production of a larger size of magnet, a more preferably effect can be obtained by effecting the compression molding and the sintering in three stages respectively.

In this case the conditions of each stage of the compression molding and the sintering are as follows:
Pressure of the primary compression molding:
  0.05 to 4 ton/cm$^2$, preferably 0.5 to 3 ton/cm$^2$,
Temperature of the primary sintering:
  300° to 800°C, preferably 400° to 700°C,
Pressure of the secondary compression molding;
  0.7 to 6 ton/cm$^2$, preferably 1.0 to 3 ton/cm$^2$,
Temperature of the secondary sintering:
  800° to 1,150°C,
Pressure of the third compression molding:
  1 to 10 ton/cm$^2$, preferably 2 to 5 ton/cm$^2$,
Temperature of the third sintering:
  1,050° to 1,400°C.

Moreover, the above described steps enable the shrinkage in the sintering even and increase the dimension accuracy even in the production of complicatedly shaped magnets.

Ba, Sr and Pb compounds to be mixed to the starting Fe compounds include carbonates, such as $BaCO_3$, $SrCO_3$, etc., oxides, such as $BaO$, $SrO$, $PbO$, etc., hydroxides, such as $Ba(OH)_2$, $Sr(OH)_2$, etc., acetates, such as $Ba(CH_3CO_2)_2 \cdot H_2O$, $Pb(CH_3CO_2)_2 \cdot 3H_2O$, etc.

According to the process of the present invention at least one of the above described Ba, Sr and Pb compounds, is mixed to the starting Fe compounds so as to adjust the product composition to be approximately $MO \cdot 6Fe_2O_3$ and as mentioned above, these compounds may be added when the starting Fe compounds are weighed or may be impregnated in the primarily compressed product or the primarily sintered product in an aqueous solution form. The primarily sintered product is not so high in the density as mentioned above and in porous, so that such product can be impregnated with the above described aqueous solution of said compound.

Furthermore, the process of the present invention is applicable to the product composition of $(Fe_2O_3+x)/MO = 4.0$ to $6.0$ ($x$ is either or both of $SiO_2$ and $GeO_2$ and 0.5 to 7.0 mole percent) in addition to the composition of approximate $MO \cdot 6Fe_2O_3$.

The magnetic property improving additives include oxides, such as $CaO$, $SiO_2$, $Al_2O_3$, $Na_2O$, $As_2O_3$, $As_2O_5$, $K_2O$, $BeO$, $B_2O_3$, $CdO$, $CeO_2$, $Cs_2O$, $Cr_2O_3$, $CoO$, $CuO$, $PbCrO_4$, $Li_2O$, $MgO$, $Mn_3O_4$, $MoO_3$, $NiO$, $Nb_2O_5$, $WO_3$, $V_2O_5$, $ZnO$, $ZrO_2$, $TiO_2$, $Sb_2O_5$, etc.; sulfates such as $BaSO_4$, $SrSO_4$, etc.; fluorides, such as $PbF_2$, $MgF_2$, etc.; iodides, such as $Al_2I_3 \cdot 6H_2O$, $BaI_2 \cdot 2H_2O$, $CaI_2 \cdot 6H_2O$, etc.; and a mixture of rare earth oxides.

These additives are added in an amount of 0.05 to 4.5 percent by weight based on the total amount of the mixture of the above described starting Fe compounds and the Ba, Sr and Pb compounds.

Furthermore, when Ba, Sr or Pb compounds are mixed to the starting Fe compounds, for example, when Ba compound is mixed to produce anisotropic barium ferrite, Sr and Pb compounds act as the magnetic property improving additive. Namely, these compounds act as the magnetic property improving additive, when the other compound among these Ba, Sr and Pb compounds is mixed to the starting Fe compounds and constitutes a part of the metal M in $MO \cdot 6Fe_2O_3$.

The magnetic property additives may be added when the starting Fe compounds are weighed and also may be impregnated to the primarily compressed product or the primarily sintered product in an aqueous solution form as described above.

Then the desirable conditions in practice of the process of the present invention will be explained hereinafter.

The pressure and temperature in the primary compression molding, the primary sintering, the secondary compression molding and the secondary sintering are as mentioned above and the production rate in both of the primary compression molding and the secondary compression molding is 8 to 40 per minute, which is a usual molding rate for such kind of powder molding (for example, the molding rate in powder metallurgy). According to the present invention, the press mold to be used in the secondary compression molding is preferred to be one having such a dimension that some space is provided between the primarily sintered product and the press mold, because the secondary compression molding increases the density of the product and further orients more completely the ferrite particles, which have been already oriented to some extent in a given direction. In this case, when some space is formed between the product to be subjected to the secondary compression molding and the press mold, the more excellent effect can be attained.

The primarily sintered product has been already shrunk, so that the press molds having different dimensions are not usually needed and a common press mold can be used in both of the primary compression molding and the secondary compression molding. However, when the product has a particular shape, it is necessary to use two types of press molds.

The process of the present invention has the following excellent various merits.

Namely, the present invention does not need the steps for calcining the starting material and pulverizing the calcined product and further does not need a plurality of pulverizing steps and a step for forming the magnetic field, so that the product can be obtained in a high efficiency and the mass production can be made and a complicated and expensive production installation is not needed. Furthermore, the cutting workings, such as the piercing, screw cutting and the like can be easily performed by usual tools and the products having a high dimension accuracy can be obtained.

The magnetic properties of the resulting anisotropic metal oxide magnets are substantially the same as those of the magnets obtained by the conventional dry process.

The other merit of the process of the present invention consists in that Ba, Sr and Pb compounds and the magnetic property improving additives can be used in an aqueous solution form after the primary compression molding or the primary sintering.

For a better understanding of the invention, reference is taken to the accompanying drawings, wherein.

The following examples are given for the purpose of illustration of this invention and are not intended as limitations thereof.

EXAMPLE 1

$\alpha$-FeOOH particles having rectangular plate crystal form, the major axis of which was 0.3 to 0.8$\mu$, and BaCO$_3$ powder were weighed and compounded so as to adjust the product composition to be BaO·6Fe$_2$O$_3$ and mixed with a wet vibration mill and then dried and granulated.

The resulting starting material was filled in a metal press mold having a bore diameter of 15 mm and a depth of 50 mm and subjected to a compression molding under a pressure of 1.5 ton/cm$^2$ and then taken out from the press mold and subjected to the primary sintering at 1,000°C for 60 minutes. Then the sintered product was put in the above described press mold and subjected to the secondary compression molding under a pressure of 2.0 ton/cm$^2$ in the same direction as in the primary compression molding and then taken out from the press mold and subjected to the secondary sintering at 1,250°C for 30 minutes to obtain an anisotropic metal oxide magnet having a composition of BaO·6Fe$_2$O$_3$ (sample 1). The apparent density and magnetic properties of this sample are shown in the following Table 1.

As a comparative example, the same starting material as described above was calcined at 1,350°C for 60 minutes and pulverized into a grain size of less than 1$\mu$ and the resulting powders were granulated. The granules were filled in the same press mold as described above and subjected to a compression molding under a pressure of 2.5 ton/cm$^2$ in a magnetic field of 8,000 Oe by means of an apparatus for forming magnetic field having a conventional structure and then taken out from the press mold and subjected to the secondary sintering at 1,200°C for 30 minutes to obtain anisotropic metal oxide magnet and then subjected to the secondary sintering at 1,200°C for 30 minutes to obtain anisotropic metal oxide magnet having a composition of BaO·6Fe$_2$O$_3$ (comparative sample 1).

As another comparative example, the same starting material as described above was filled in the same press mold as described above and subjected to a compression molding under a pressure of 3.5 ton/cm$^2$ and then taken out from the press mold and sintered at 1,250°C for 30 minutes to obtain anisotropic metal oxide magnet having a composition of BaO·6Fe$_2$O$_3$ (comparative sample 2).

The apparent density and the magnetic properties of the above comparative samples are shown in the following table.

TABLE 1

| | Density (g/cm$^3$) | Br (G) | BHc (Oe) | BHmax (×10$^6$ OeG) |
|---|---|---|---|---|
| Sample 1 | 4.8 | 3,400 | 2,000 | 2.7 |
| Comparative Sample 1 | 4.8 | 3,150 | 2,000 | 2.4 |
| Comparative Sample 2 | 4.8 | 3,100 | 1,500 | 2.0 |

As seen from the table, the magnet (sample 1) obtained by the process of the present invention is more excellent in the magnetic properties than the magnet (comparative sample 1) obtained by the conventional dry magnetic field forming process and the magnet (comparative sample 2) obtained by one time of compression molding and one time of sintering.

EXAMPLE 2

$\alpha$-FeOOH particles having needle crystal form, the major axis of which was 0.3 to 0.8$\mu$, and $SrCO_3$ powder were weighed and compounded so as to adjust the product composition to be $SrO \cdot 6Fe_2O_3$ and mixed with a wet vibration mill and then dried and granulated.

The resulting starting material was filled in the same metal press mold as used in Example 1 and subjected to a compression molding under a pressure of 2.0 ton/cm² and then taken out from the press mold and subjected to the primary sintering at 1,000°C for 60 minutes. Then the sintered product was put in the above described press mold and subjected to the secondary compression molding under a pressure of 2.5 ton/cm² in the same direction as in the primary compression molding and then taken out from the press mold and subjected to the secondary sintering at 1,230°C for 30 minutes to obtain an anisotropic metal oxide magnet having a composition of $SrO \cdot 6Fe_2O_3$(sample 1). The apparent density and the magnetic properties of this sample are shown in the following Table 2.

$\alpha$-$Fe_2O_3$ particles having needle and rectangular plate crystal forms, the major axis of which was 0.3 to 0.6$\mu$ and which were obtained by thermal decomposition of the above described $\alpha$-FeOOH, and $SrCO_3$ powder were compounded so as to adjust the product composition to be $SrO \cdot 6Fe_2O_3$. Then the resulting starting material was treated under the same condition as described above to obtain an anisotropic metal oxide magnet having a composition of $SrO \cdot 6Fe_2O_3$(sample 2). The apparent density and the magnetic properties of this sample are shown in the following Table 2.

$Fe_3O_4$ particles having rectangular plate crystal form, the major axis of which was 0.3 to 1$\mu$ and which were obtained by thermal decomposition of the above described $\alpha$-$Fe_2O_3$, and $SrCO_3$ powder were compounded so as to adjust the product composition to be $SrO \cdot 6Fe_2b3$. Then the resulting starting material was treated under the same condition as described above to obtain an anisotropic metal oxide magnet having a composition of $SrO \cdot 6Fe_2O_3$(sample 3). The apparent density and the magnetic properties of this sample are shown in the following Table 2.

$\gamma$-$Fe_2O_3$ particles having rectangular plate crystal form, the major axis of which was 0.3 to 0.8$\mu$ and which were obtained by reoxidation of the above described $Fe_3O_4$, and $SrCO_3$ powder were compounded so as to adjust the product composition to be $SrO \cdot 6Fe_2b3$. The resulting starting material was treated under the same condition as described above to obtain anisotropic metal oxide magnet having a composition of $SrO \cdot 6Fe_2O_3$ (sample 4). The apparent density and the magnetic properties of this sample are shown in the following Table 2.

As a comparative example, the same starting material as used in the production of sample 1 was filled in the same press mold as described above and subjected to a compression molding under a pressure of 3.0 ton/cm² and then taken out from the press mold and sintered at 1,250°C for 30 minutes to obtain an anisotropic metal oxide magnet having a composition of $SrO \cdot 6Fe_2O_3$ (comparative sample 1). The apparent density and the magnetic properties of this comparative sample are shown in the following Table 2.

TABLE 2

| | D Density (g/cm³) | Br (G) | BHc (Oe) | BHmax (×10⁶ OeG) |
|---|---|---|---|---|
| Sample 1 | 4.9 | 3,500 | 2,000 | 3.0 |
| Sample 2 | 4.9 | 3,400 | 1,950 | 2.8 |
| Sample 3 | 4.87 | 3,350 | 1,890 | 2.7 |
| Sample 4 | 4.86 | 3,300 | 1,870 | 2.5 |
| Comparative Sample 1 | 4.7 | 3,200 | 1,850 | 2.2 |

As seen from the table, all the magnets (samples 1 to 4) obtained by the process of the present invention are more excellent in the magnetic properties than the magnet (comparative sample 1) obtained by one time of compression molding and one time of sintering.

EXAMPLE 3

The same starting material as described in Example 1 was used. Anisotropic metal oxide magnets having a composition of $BaO \cdot 6Fe_2O_3$ (sample 1 and comparative sample 1) were produced under the same conditions as described in sample 1 and comparative sample 1 in Example 2, respectively. The apparent density and the magnetic properties of the thus obtained samples are shown in the following Table 3.

TABLE 3

| | Density (g/cm³) | Br (G) | BHc (Oe) | BHmax (×10⁶ OeG) |
|---|---|---|---|---|
| Sample 1 | 4.9 | 3,500 | 1,800 | 2.4 |
| Comparative Sample 1 | 4.7 | 2,800 | 1,700 | 1.8 |

EXAMPLE 4

As a magnetic property improving additive, lead oxide and sodium oxide were added to the same starting material as used in the production of sample 1 in Example 2, and an anisotropic metal oxide magnet was produced under the same condition as described in Example 2. The apparent density and the magnetic properties of the thus obtained magnet are as follows.

| Apparent density | 5.0 g/cm³ |
|---|---|
| Br | 4,200 (G) |
| BHc | 2,700 (Oe) |
| BHmax | 3.9 (×10⁶ OeG) |

EXAMPLE 5

$\alpha$-$Fe_2O_3$ particles obtained by thermal decomposition of $\alpha$-FeOOH having rectangular plate crystal form, the major axis of which was 0.3 to 1$\mu$, and PbO powder were weighed and compounded so as to adjust the product composition to be $PbO \cdot 6Fe_2O_3$ and mixed with a wet vibration mill and then dried and granulated.

The resulting starting material was filled in a metal press mold having a bore diameter of 15 mm and a depth of 50 mm and subjected to a compression molding under a pressure of 2.7 ton/cm² and then taken out from the press mold and subjected to the primary sintering at 900°C for 60 minutes. Then the sintered product was put in the above described press mold and subjected to the secondary compression molding under a pressure of 3.6 ton/cm² in the same direction as in the primary compression molding and then taken out from the press mold and subjected to the secondary sintering at 1,150°C for 15 minutes to obtain an anisotropic metal oxide magnet having a composition of PbO·6Fe₂c]3.

The apparent density and the magnetic properties of the thus obtained magnet are as follows.

| | |
|---|---|
| Apparent density | 4.85 g/cm³ |
| Br | 3,100 (G) |
| BHc | 1,500 (Oe) |
| BHmax | 2.3 (×10⁶ OeG) |

EXAMPLE 6

α-FeOOH particles having needle crystal form, the major axis of which was 0.3 to 1μ, and SrCO₃ powder were weighed and compounded so as to adjust the product composition to be SrO·6Fe₂O₃. Further, about 0.4 percent of PbO and about 0.7 percent of Na₂O were added thereto as magnetic property improving additives, and the resulting compound was mixed with a wet vibration mill, dried and granulated.

Figure 1:
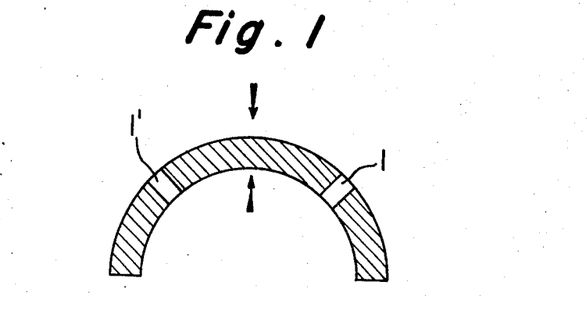
FIG. 1 is a cross-sectional view of an embodiment of the anisotropic metal oxide magnets produced by the process of the present invention and the arrow shows the compression direction.
Figure 2:
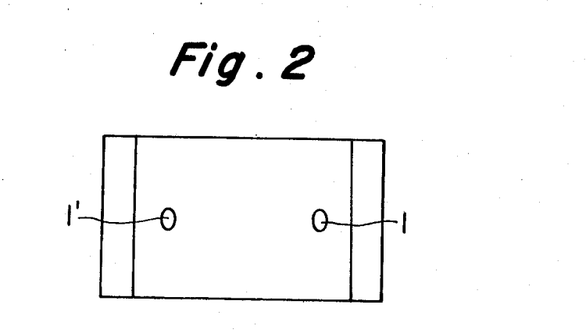
FIG. 2 a plan of said magnet.

The resulting starting material was filled in a metal press mold capable of forming segments as shown in FIGS. 1 and 2 and subjected to a compression molding under a pressure of 1.5 ton/cm² in the arrow direction in FIG. 1 and then taken out from the press mold and subjected to the primary sintering at 1,000°C for 60 minutes. Then, the sintered product was put in the above described press mold and subjected to the secondary compression molding under a pressure of 2.0 ton/cm² in the same direction as in the primary compression molding and then taken out from the press mold. After bores 1 and 1' were formed as shown in FIGS. 1 and 2 by means of a tool, the secondarily compressed body was subjected to the secondary sintering at 1,250°C for 20 minutes to obtain an anisotropic metal oxide magnet.

The inner radius of the thus obtained magnet was 25 mm, the outer radius was 32 mm, the length was 36 mm, the width was 64 mm and the bore diameter was 4 mm. During the above described secondary sintering of the magnet, deformation and strain were very small, and the dimension accuracy in the radial direction was less than 0.8 percent of the radius.

The above described magnet did not need finishing grinding works, and the secondarily sintered product was able to be directly used in practice as a segment-shaped pole piece of a motor.

The magnetic properties of the thus obtained magnet are as follows:

| | |
|---|---|
| Active magnet flux density | 44,500 Maxwell |
| BHmax | 2.8 (×10⁶ OeG) |
| BHc | 2,700 (oe) |
| Br | 3,500 (G) |

EXAMPLE 7

α-FeOOH particles having needle and rectangular plate crystal forms, the major axis of which was 0.2 to 1.2μ, were granulated to obtain a starting material. The starting material was filled in a metal press mold having a bore diameter of 15 mm and a depth of 50 mm and subjected to a compression molding under a pressure of 1 ton/cm² and then taken out from the press mold. The compressed body was impregnated with an aqueous solution containing 35 percent by weight of Ba(CH₃CO₂)₂·H₂O so as to adjust the product composition to be BaO·6Fe₂O₃, dried and subjected to the primary sintering at 1,000°C for 60 minutes to obtain a primarily sintered product. Then the sintered product was put in a metal press mold having a bore diameter of 19 mm and a depth of 50 mm, subjected to the secondary compression molding under a pressure of 3 ton/cm² in the same direction as in the primary compression molding, and then subjected to the secondary sintering at 1,270°C for 15 minutes to obtain an anisotropic metal oxide magnet having a composition of BaO·6Fe₂O₃ (sample 1). The apparent density and the magnetic properties of sample 1 are shown in the following Table 4.

The above described primarily sintered product was impregnated with an aqueous solution containing 2.1 percent by weight of AlI₃·6H₂O as a magnetic property improving additive so that the amount of AlI₃·6H₂O added was 0.5 percent by weight, dried by heating, put in the above described press mold again, and subjected to the secondary compression molding under a pressure of 2.5 ton/cm² in the same direction as in the primary compression molding, and then subjected to the secondary sintering at 1,250°C for 30 minutes to obtain an anisotropic metal oxide magnet (sample 2). The apparent density and the magnetic properties of sample 2 are also shown in the following Table 4.

TABLE 4

| | Density (g/cm³) | Br (G) | BHc (Oe) | BHmax (×10⁶ OeG) |
|---|---|---|---|---|
| Sample 1 | 4.85 | 3,450 | 2,050 | 2.85 |
| Sample 2 | 4.9 | 3,500 | 2,100 | 2.90 |

EXAMPLE 8

α-FeOOH particles having needle and rectangular plate crystal forms, the major axis of which was 0.2 to 1.2μ, were granulated to obtain a starting material. The starting material was filled in a metal press mold having a bore diameter of 15 mm and a depth of 50 mm and subjected to a compression molding under a pressure of 1.5 ton/cm² and subjected to a primary sintering at 1,000°C for 60 minutes to obtain a primarily sintered product. Then the sintered product was impregnated with an aqueous solution containing 35 percent by weight of Ba(CH₃CO₂)₂·H₂O so as to adjust the product composition to be BaO·6Fe₂O₃, dried by heating, put in the above described press mold again, and subjected to the secondary compresssion molding under a pressure of 2 ton/cm² in the same direction as in the primary compression molding and then subjected to the secondary singtering at 1,250°C for 30 minutes to obtain an anisotropic metal oxide magnet having a composition of BaO·6Fe₂O₃ (sample 1). The apparent density and the magnetic properties of sample 1 are shown in the following Table 5.

The above described primarily sintered product was impregnated with an aqueous solution containing 35 percent by weight of Ba(CH₃CO₂)₂·H₂O and 2.5 percent by weight of CaI₂·6H₂O as a magnetic property improving additive so as to adjust the product composition to be BaO·6Fe₂O₃ containing about 0.6 percent by weight of CaI₂·6H₂O, dried by heating, put in the above press mold again, and subjected to the secondary compression molding under a pressure of 3.0 ton/cm$^2$ in the same direction as in the primary compression molding, and then subjected to the secondary sintering at 1,270°C for 20 minutes to obtain an anisotropic metal oxide magnet (sample 2). The apparent density and the magnetic properties of sample 2 are also shown in Table 5.

TABLE 5

| | Density (g/cm$^3$) | Br (G) | BHc (Oe) | BHmax (×10$^6$ OeG) |
|---|---|---|---|---|
| Sample 1 | 4.9 | 3,150 | 1,750 | 2.5 |
| Sample 2 | 4.92 | 3,300 | 1,950 | 2.65 |

EXAMPLE 9 $\alpha$-Fe$_2$O$_3$ particles having needle crystal form, the major axis of which was 0.3 to 0.7$\mu$, and SrCO$_3$ powder and further 1.0 percent by weight of PbO and 1.2 percent by weight of BaO as magnetic property improving additives were weighed and compounded so as to adjust the product composition to be approximately MO·6Fe$_2$O$_3$, wherein M is composed of Sr, Pb and Ba, but the composition ratio is not definite, and mixed with a wet vibration mill, and then dried and granulated.

The resulting starting material was filled in the same press mold as used in Example 8, and subjected to a compression molding under a pressure of 1.5 ton/cm$^2$ and then taken out from the press mold and subjected to the primary sintering at 1,000°C for 60 minutes. Then, the sintered product was impregnated with an aqueous solution containing 2.1 percent by weight of BaI$_2$·2H$_2$O as a magnetic property improving additive so that the amount of BaI$_2$·2H$_2$O added was 0.5 percent by weight, dried by heating, put in the above described press mold again, and subjected to the secondary compression molding under a pressure of 2.3 ton/cm$^2$ in the same direction as in the primary compression molding, and then subjected to the secondary sintering at 1,230°C for 30 minutes to obtain an anisotropic metal oxide magnet. The apparent density and the magnetic properties of the thus obtained magnet are as follows:

| Apparent density | 5.0 g/cm$^3$ |
|---|---|
| Br | 4,150 (G) |
| BHc | 1,800 (Oe) |
| BHmax | 4.0 (×10$^6$ OeG) |

EXAMPLE 10

The same starting material as used in Example 9 was filled in a metal press mold having a bore of 15 mm × 10 mm × 40 mm and subjected to a compression molding under a pressure of 1.5 ton/cm$^2$ and then taken out from the press mold and subjected to the primary sintering at 1,000°C for 60 minutes to obtain a primarily sintered product. Then the sintered product was put in the above described press mold and subjected to the secondary compression molding under a pressure of 2.0 ton/cm$^2$ in the same direction as in the primary compression molding and then taken out from the press mold and subjected to the secondary sintering at 1,240°C for 30 minutes to obtain an anisotropic metal oxide magnet (sample 1). The apparent density and magnetic properties of sample 1 are shown in the following Table 6.

Next, the above described primarily sintered product was put in a metal press mold having the same dimension and shape as described above, except that only the upper punch had a projecting molding surface having a radius of 15 mm, and subjected to the secondary compression molding and to the secondary sintering under the same condition as described above to obtain an anisotropic metal oxide magnet (sample 2). The apparent density and magnetic properties of sample 2 are also shown in Table 6.

TABLE 6

| | Density (g/cm$^3$) | Active magnet flux density (Maxwell) |
|---|---|---|
| Sample 1 | 4.92 | 2,200 |
| Sample 2 | 4.92 | 2,150 |

As seen from the above table, even when the secondary compression molding is effected in a press mold having different shape from that of a press mold in the primary compression molding, the magnetic property of the resulting anisotropic metal oxide magnet does not substantially vary.

EXAMPLE 11

$\alpha$-FeOOH particles having rectangular plate crystal form, the major axis of which was smaller than 0.3$\mu$, and SrCO$_3$ powder were weighed and compounded so as to adjust the product composition to be approximately SrO·6Fe$_2$O$_3$. Further, 0.5 percent by weight of PbF$_2$ was added thereto as a magnet property improving additive. The resulting compound was mixed with a wet vibration mill, dried and granulated.

The resulting starting material was filled in the same press mold as used in Example 8 and subjected to a compression molding under a pressure of 2.0 ton/cm$^2$ and then taken out from the press mold and subjected to the primary sintering at 1,000°C for 60 minutes. Then the sintered product was put in the above described press mold again and subjected to the secondary compression molding under a pressure of 3.0 ton/cm$^2$ in the same direction as in the primary compression molding and then subjected to the secondary sintering at 1,250°C for 30 minutes to obtain an anisotropic metal oxide magnet. The apparent density and magnetic properties of the thus obtained magnet are as follows:

| Apparent density | 4.9 g/cm$^3$ |
|---|---|
| Br | 2,300 (G) |
| BHc | 1,800 (Oe) |
| BHmax | 1.3 (×10$^6$ OeG) |

Next, the above described treatment was repeated under the same condition as described above, except that $\alpha$-FeOOH having needle and rectangular plate crystal forms, the major axis of which was larger than 3$\mu$, was used, to obtain an anisotropic metal oxide magnet. The apparent density and magnetic properties of the thus obtained magnet are as follows:

| Apparent density | 4.85 g/cm$^3$ |
|---|---|
| Br | 2,250 (G) |
| BHc | 1,800 (Oe) |
| BHmax | 1.2 (×10$^6$ OeG) |

The above described experiments show that the preferred size of major axis of particle crystal to be used for the production of the anisotropic metal oxide magnet is 0.3 to 3$\mu$.

EXAMPLE 12

α-FeOOH particles having needle and rectangular plate crystal forms, the major axis of which was 0.3 to 0.9μ, and $SrCO_3$ powders were compounded so as to adjust the product composition to be $SrO \cdot 6Fe_2O_3$. Further, 0.7 percent by weight of $PbF_2$ as a magnetic property improving additive and 50 percent by weight of water as a solvent were added thereto, and the resulting mixture was kneaded.

The resulting starting material was filled in a metal press mold having a bore diameter of 15 mm and a depth of 50 mm and subjected to a compression molding under a pressure of 0.8 ton/cm². In this case, a filter was arranged in the press mold so that the solvent could be easily separated body was taken out from the press mold, dried and subjected to the primary sintering at 1,000°C for 60 minutes. The sintered product was put in the above described press mold again and subjected to the secondary compression molding under a pressure of 2.5 ton/cm² in the same direction as in the primary compression molding and then taken out from the press mold and subjected to the secondary sintering at 1,230°C for 30 minutes to obtain an anisotropic metal oxide magnet. The apparent density and the magnetic properties of the thus obtained magnet are as follows:

| | |
|---|---|
| Apparent density | 4.95 g/cm³ |
| Br | 3,950 (G) |
| BHc | 2,500 (Oe) |
| BHmax | 3.8 (×10⁶ OeG) |

EXAMPLE 13

The same α-FeOOH particles and $SrCO_3$ powders as used in Example 12 were compounded so as to adjust the product composition to be $SrO \cdot 6Fe_2O_3$. Further, 0.7 percent by weight of $PbF_2$ was added thereto as a magnetic property improving additive. The resulting starting material was filled in a metal press mold having a bore diameter of 35 mm and a depth of 50 mm and subjected to a compression molding under a pressure of 0.5 ton/cm² and then taken out from the press mold and subjected to the primary sintering at 400°C for 60 minutes. The sintered product was put in the above described press mold and subjected to the secondary compression molding under a pressure of 1.7 ton/cm² in the same direction as in the primary compression molding and then taken out from the press mold and subjected to the secondary sintering at 1,000°C for 60 minutes. Then, the sintered product was put in the above described press mold and subjected to the third compression molding under a pressure of 3.5 ton/cm² and then taken out from the press mold and subjected to the third sintering at 1,250°C for 20 minutes to obtain an anisotropic metal oxide magnet. The apparent density and the magnetic properties of the thus obtained magnet are as follows:

| | |
|---|---|
| Apparent density | 5.0 g/cm³ |
| Br | 4,000 (G) |
| BHc | 2,000 (Oe) |
| BHmax | 3.8 (×10⁶ OeG) |

What is claimed is:

1. A process of producing anisotropic metal oxide magnets which consists essentially of mixing particles having rectangular plate or needle crystal form, selected from α-FeOOH having (100) crystal plane, α-$Fe_2O_3$ having (0001) crystal plane and obtained by thermally decomposing the above-described α-FeOOH, $Fe_3O_4$ having (111) crystal plane and obtained by reducing the above-described α-$Fe_2O_3$ and γ-$Fe_2O_3$ having (111) crystal plane and obtained by reoxidizing the above-described $Fe_3O_4$, the major axis of said crystal being 0.1–5μ, with at least one compound selected from the group consisting of carbonates, oxides, hydroxides, acetates and sulfates of barium, strontium and lead so as to adjust the product composition to be approximately $MO \cdot 6Fe_2O_3$, wherein M is at least one metal selected from the group consisting of Ba, Sr and Pb, charging the resulting mixture in a press mold and subjecting the mixture to cold compression molding under a pressure of about 0.5 to 3 ton/cm², releasing said pressure, partially sintering the compressed product at a temperature of 300° to 1,150°C., putting the sintered product in a press mold and subjecting the sintered product to further cold compression molding in the same direction as in the first compression molding under a pressure at least as high as the first-mentioned pressure up to 10 ton/cm², releasing the last-named pressure, and fully sintering the further compressed product at a temperature of 1,050° to 1,400°C.

2. The process as claimed in claim 1, and adding to said mixture prior compression 0.05 to 4.5 percent by weight of at least one compound selected from the group consisting of $CaO$, $SiO_2$, $Al_2O_3$, $Na_2O$, $As_2O_3$, $As_2O_5$, $K_2O$, $BeO$, $B_2O_3$, $CdO$, $CeO_2$, $Cs_2O$, $Cr_2O_3$, $CoO$, $CuO$, $PbCrO_4$, $Li_2O$, $MgO$, $Mn_3O_4$, $MoO_3$, $NiO$, $Nb_2O_5$, $WO_3$, $V_2O_5$, $ZnO$, $ZrO_2$, $TiO_2$, $Sb_2O_5$, $BaSO_4$, $SrSO_4$, $PbF_2$, $MgF_2$, $Al_2I_3 \cdot 6H_2O$, $BaI_2 \cdot 2H_2O$ and $CaI_2 \cdot 6H_2O$ as a magnetic-property-improving additive.

3. The process as claimed in claim 2, wherein when M is barium, said compound has a cation selected from the group consisting of strontium and lead.

4. The process as claimed in claim 2, wherein when M is strontium, said compound has a cation selected from the group consisting of barium and lead.

5. The process as claimed in claim 2, wherein when M is lead, said compound has a cation selected from the group consisting of barium and strontium.

6. A process of producing anisotropic metal oxide magnets which consists essentially of subjecting particles having rectangular plate or needle crystal form, selected from αFeOOH having (100) crystal plane, α-$Fe_2O_3$ having (0001) crystal plane and obtained by thermally decomposing the above-described α-FeOOH, $Fe_3O_4$ having (111) crystal plane and obtained by reducing the above-described α-$Fe_2O_3$ and γ-$Fe_2O_3$ having (111) crystal plane and obtained by reoxidizing the above-described $Fe_3O_4$, the major axis of said crystal being 0.1 to 5μ, to cold compression molding under a pressure of about 0.5 to 3 ton/cm² in a press mold, releasing said pressure, impregnating the compressed product with an aqueous solution of at least one water-soluble compound selected from the group consisting of barium acetate, strontium acetate and lead acetate so as to adjust the product composition to be approximately $MO \cdot 6Fe_2O_3$, wherein M is at least one metal selected from the group consisting o4 Ba, Sr and Pb, drying the impregnated product, partially sintering the thus-treated product at a temperature of 300° to 1,150°C., putting the sintered product in a press mold and subjecting the sintered product to further cold compression molding under a pressure at least as high as the first-mentioned pressure up to 10 ton/cm², releasing the last-named pressure, and fully sintering the further compressed product at a temperature of 1,050° to 1,400°C.

7. A process as claimed in claim 6, wherein said product as first compressed is impregnated with an aqueous solution of at least one water-soluble compound selected from the group consisting of barium acetate, strontium acetate and lead acetate together with an aqueous solution of 0.05 to 4.5 percent by weight of at least one water-soluble magnetic-property-improving additive selected from the group consisting of $Al_2I_3 \cdot 6H_2O$, $BaI_2 \cdot 2H_2O$ and $CaI_2 \cdot 6H_2O$.

8. A process as claimed in claim 6, wherein an aqueous solution of 0.05 to 4.5 percent by weight of at least one water-soluble magnetic-property-improving additive selected from the group consisting of $Al_2I_3 \cdot 6H_2O$, $BaI_2 \cdot 2H_2O$ and $CaI_2 \cdot 6H_2O$ is impregnated on the product as first sintered.

9. A process of producing anisotropic metal oxide magnets which consists essentially of subjecting particles having rectangular plate or needle crystal form, selected from $\alpha$-FeOOH having (100) crystal plane and $Fe_3O_4$ having (111) crystal plane, the major axis of said crystal being 0.1 to 5$\mu$, to cold compressing molding under a pressure about 0.5 to 3 ton/cm² in a press mold, releasing said pressure, partially sintering the compressed product at a temperature of 300°C. to 1,150°C., impregnating the sintered product with an aqueous solution of at least one water-soluble compound selected from the group consisting of barium acetate, strontium acetate and lead acetate so as to adjust the product composition to be approximately $MO \cdot 6Fe_2O_3$, wherein M is at least one metal selected from the group consisting of Ba, Sr and Pb, drying the impregnated product, putting the thus-treated product in a press mold and subjecting the impregnated product to further cold compression molding in the same direction as in the first compression molding under a pressure at least as high as the first-mentioned pressure up to 10 ton/cm², releasing the last-named pressure, and fully sintering the further compressed product at a temperature of 1,050° to 1,400°C.

10. A process as claimed in claim 9, wherein the product as first sintered is impregnated with an aqueous solution of at least one water-soluble compound selected from the group consisting of barium acetate, strontium acetate and lead acetate together with an aqueous solution of 0.05 to 4.5 percent by weight of at least one water-soluble magnetic-property-improving additive selected from the group consisting of $Al_2I_3 \cdot 6H_2O$, $BaI_2 \cdot 2H_2O$ and $CaI_2 \cdot 6H_2O$.

11. A process of producing anisotropic metal oxide magnets which consists essentially of mixing particles having rectangular plate or needle crystal form, selected from $\alpha$-FeOOH having (100) crystal plane, $\alpha$-$Fe_2O_3$ having (0001) crystal plane and obtained by thermally decomposing the above-described $\alpha$-FeOOH, $Fe_3O_4$ having (111) crystal plane and obtained by reducing the above-described $\alpha$-$Fe_2O_3$ and $\gamma$-$Fe_2O_3$ having (111) crystal plane and obtained by reoxidizing the above-described $Fe_3O_4$, the major axis of said crystal being 0.1-5$\mu$, with at least one compound selected from the group consisting of carbonates, oxides, hydroxides, acetates and sulfates of barium, strontium and lead so as to adjust the product composition to be approximately $MO \cdot 6Fe_2O_3$, wherein M is at least one metal selected from the group consisting of Ba, Sr and Pb, charging the resulting mixture in a press mold and subjecting the mixture to cold compression molding under a pressure of about 0.5 to 3 ton/cm², releasing said pressure, partially sintering the compressed product at a temperature of 300° to 800°C., putting the sintered product in a press mold and subjecting the sintered product to further cold compression molding in the same direction as in the first compression molding under a pressure at least as high as the first-mentioned pressure up to 6 ton/cm.² releasing the last-named pressure, further partially sintering the compressed product at a temperature of 800° to 1,150° C., putting the further sintered product in a press mold and subjecting the further sintered product to a still further cold compression molding in the same direction as in the first compressing molding under a pressure at least as high as the last-mentioned pressure up to 10 ton/cm.², releasing the last-named pressure and fully sintering the still further compressed product at a temperature of 1,050° to 1,400°C.

12. A process of producing anisotropic metal oxide magnets which consists essentially of mixing particles having rectangular plate or needle crystal form, selected from $\alpha$-FeOOH having (100) crystal plane, $\alpha$-$Fe_2O_3$ having (0001) crystal plane and obtained by thermally decomposing the above-described $\alpha$-FeOOH, $Fe_3O_4$ having (111) crystal plane and obtained by reducing the above-described $\alpha$-$Fe_2O_3$ and $\gamma$-$Fe_2O_3$ having (111) crystal plane and obtained by reoxidizing the above-described $Fe_3O_4$, the major axis of said crystal being 0.1-5$\mu$, with at least one compound selected from the group consisting of carbonates, oxides, hydroxides, acetates and sulfates of barium, strontium and lead so as to adjust the product composition to be approximately $MO \cdot 6 Fe_2O_3$, wherein M is at least one metal selected from the group consisting of Ba, Sr and Pb, adding water to the resulting mixture and kneading thoroughly the resulting mass, charging the mass in a press mold provided with a filter and subjecting the mass to cold compression molding under a pressure of about 0.5 to 3 ton/cm² to separate and discharge water, releasing said pressure, drying the compressed product, partially sintering the dried compressed product at temperature of 300° to 1,150° C., putting the sintered product in a press mold and subjecting the sintered product to further cold compression molding in the same direction as the first compression molding under a pressure at least as high as the first-mentioned pressure up to 10 ton/cm², releasing the last-named pressure, and fully sintering the further compressed product at a temperature of 1,050° to 1,400°C.

* * * * *